United States Patent
Agrawal et al.

(10) Patent No.: US 8,326,824 B2
(45) Date of Patent: Dec. 4, 2012

(54) METHODS TO ESTIMATE EXISTING CACHE CONTENTS FOR BETTER QUERY OPTIMIZATION

(75) Inventors: Vatsalya Agrawal, Indore (IN); Vivek Bhaskar, Mokama (IN); Saibaba Konduru, Hyderabad (IN); Ahmed Shareef, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 12/789,496

(22) Filed: May 28, 2010

(65) Prior Publication Data

US 2011/0296108 A1    Dec. 1, 2011

(51) Int. Cl.
G06G 7/00    (2006.01)
(52) U.S. Cl. ......... 707/719; 711/113; 711/123; 711/126
(58) Field of Classification Search .................. 707/719; 711/113, 123, 126
See application file for complete search history.

(56) References Cited

U.S. PATENT DOCUMENTS

| | | | |
|---|---|---|---|
| 5,812,996 A * | 9/1998 | Rubin et al. .................. | 1/1 |
| 5,822,749 A | 10/1998 | Agarwal | |
| 6,073,129 A | 6/2000 | Levine et al. | |
| 6,957,211 B1 * | 10/2005 | Tyulenev et al. .............. | 707/718 |
| 6,996,556 B2 | 2/2006 | Boger et al. | |
| 7,058,764 B2 * | 6/2006 | Bearden ........................ | 711/129 |
| 7,925,850 B1 * | 4/2011 | Waldspurger et al. ........ | 711/162 |
| 2006/0230013 A1 | 10/2006 | Hrle et al. | |
| 2009/0254522 A1 | 10/2009 | Chaudhuri et al. | |

OTHER PUBLICATIONS

Safaeel, Ali-Asghar et al, "Caching Intermediate Results for Multiple-Query Optimization"; aiccsa, pp. 412-415; IEEE/ACS International Conference on Comptuer Systems and Applications, 2007.
Qureshi, Nasir, "Optimizing Database Queries java: Java [Internet]", Version 2, knol; Aug. 1, 2008; available from http://knol.google.com/k/optimizing-database-queries-java#Optimizing_Database_Queries.
D.M.A. Hussain et al (Eds), "Practical Optimal Caching Using Multiple Virtual Caches in Multiple Query Optimization"; IMTIC 2008, CCIS 20, pp. 366-377; Springer-Verlag Berlin Heidelberg 2008.
Ramamurthy, R. et al, "Buffer Pool Aware Query Optimization", CIDR 2005.

* cited by examiner

*Primary Examiner* — Cheyne Ly
(74) *Attorney, Agent, or Firm* — North Shore Patents, P.C.; Michele Liu Baillie

(57) ABSTRACT

A method for estimating contents of a cache determines table descriptors referenced by a query, and scans each page header stored in the cache for the table descriptor. If the table descriptor matches any of the referenced table descriptors, a page count value corresponding to the matching referenced table descriptor is increased. Alternatively, a housekeeper thread periodically performs the scan and stores the page count values in a central lookup table accessible by threads during a query run. Alternatively, each thread independently maintains a hash table with page count entries corresponding to table descriptors for each table in the database system. A thread increases or decreases the page count value when copying or removing pages from the cache. A page count value for each referenced table descriptor is determined from a sum of the values in the hash tables. A master thread performs bookkeeping and prevents hash table overflows.

15 Claims, 6 Drawing Sheets

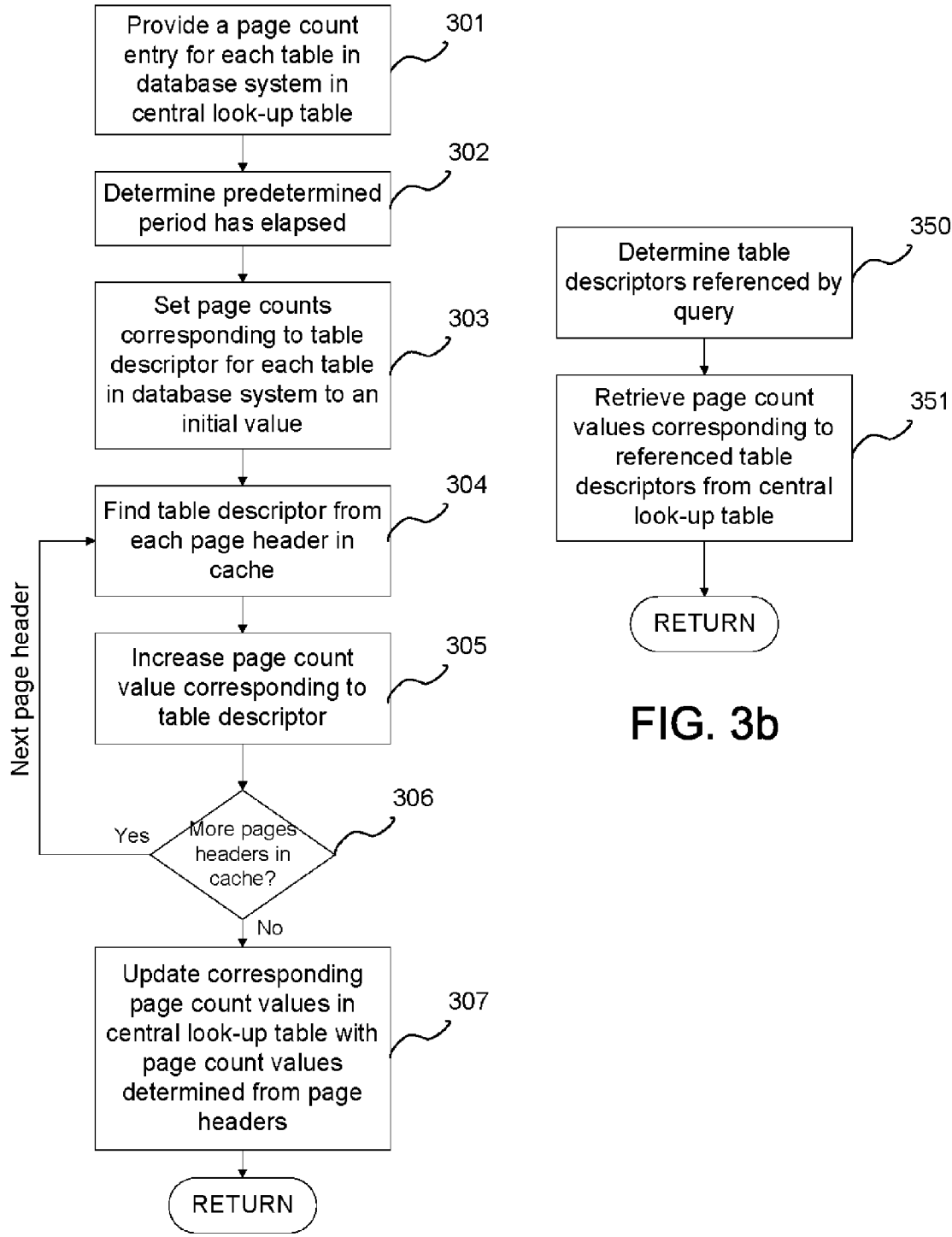

Hash Table $H_1$
Owner = $P_1$
Page count entries = n
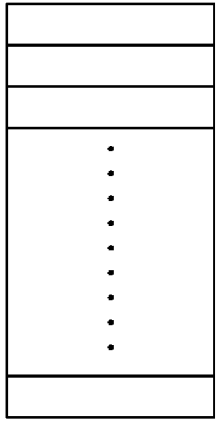
Hash Table $H_2$
Owner = $P_2$
Page count entries = n
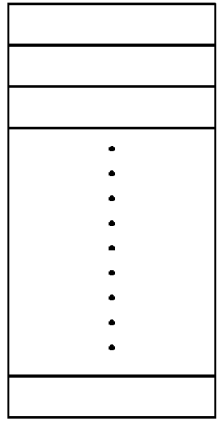
Hash Table $H_m$
Owner = $P_m$
Page count entries = n
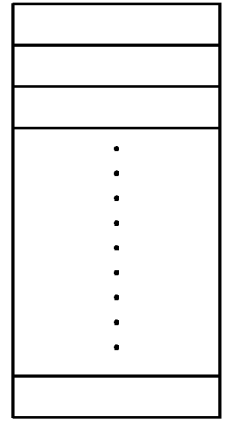
FIG. 5

METHODS TO ESTIMATE EXISTING CACHE CONTENTS FOR BETTER QUERY OPTIMIZATION

BACKGROUND

A query optimizer is an essential component of many database management systems. The accuracy of the optimizer depends on the accuracy of the statistics, cache estimations, and other parameters upon which the optimizer depends in quantifying a cost of a particular query execution plan. Current optimizers try to model the cache behavior in selecting the best execution plan by making the optimizer aware of the available cache size. However, these optimizers do not consider the contents of the cache.

While quantifying a cost of a query execution plan, current optimizers assume that the cache is "clean", i.e., the cache does not contain any useable data. However, this assumption may not be correct. For example, suppose that a query $Q_1$ accesses a table T and copies its pages into the cache. After the execution of $Q_1$ finishes, some of the data pages of T might still be in the cache. If the next query $Q_2$ is to access the same pages which are already present in the cache, then it is inaccurate to quantify the cost of the execution plan for $Q_2$ without considering the pages of T that are already in the cache. Since accessing a page in cache costs less than accessing the page from disk, the quantification of costs for the execution plans for $Q_2$ may not reasonably reflect the actual performance, leading to the selection of a sub-optimal plan.

In one current approach, a count is maintained for each table in the database system, where the count represents the number of cached pages of that particular table. Each database process which copies a page of the table into the cache, or removes a page of the table from the cache, would increment or decrement the table's count accordingly. In the case of multiprocessing systems, there would be a pool of threads in parallel to execute the queries. Hence, multiple threads may increment or decrement the count at a time. In order to get accurate values, threads would have to take a read/write lock on the count variable. However, this would introduce extra overhead of synchronization that may significantly impact the performance negatively.

In this approach, if approximate counts are acceptable and locks are avoided, the potential error may be unreasonable. If a 'K' number of threads work on the same table and copy in a page from the table, and the threads try to access the same count variable without taking a lock, then the count could be incremented by 1' instead of 'K'. In the worst case, the count may be off by 'm−1', with 'm' being the number of threads supported. When the same scenario happens again for the second time, the count will be '2' instead of 2*m. Thus, at some point of time when the actual count is C, the count value could only be C/m. Hence, the errors propagate with this approach.

BRIEF SUMMARY

In an embodiment of a method for estimating existing cache contents comprises: determining referenced table descriptors for one or more tables in a database system; determining a page count value for each referenced table descriptor using a single scan of table descriptors in page headers stored in a cache; and estimating contents of the cache using the determined page count values. In this embodiment, the page count value comprises the number of cache pages currently present in the cache corresponding to the referenced table.

In one embodiment, the table descriptors referenced by a query is determined, and the page count for each referenced table descriptor is set to an initial value. For each page header stored in the cache, the table descriptor is found from the page header, and it is determined if the table descriptor from the page header matches any of the referenced table descriptors. In response to determining that the table descriptor from the page header matches any of the referenced table descriptors, the page count value corresponding to the matching referenced table descriptor is increased.

In another embodiment, a central lookup table is provided comprising a page count entry corresponding to the table descriptor for each table in the database system. During the scan of the cache, a page count value corresponding to the table descriptor for each table in the database system is set to an initial value in an intermediate memory. For each page header stored in the cache, finding the table descriptor from the page header and increasing the page count value corresponding to the table descriptor from the page header. The corresponding page count value in the central look-up table is updated with the page count values determined from the page headers stored in the cache. For each table descriptor referenced by a query, the corresponding page count values are retrieved from the central lookup table.

In another embodiment, a hash table is provided for each of a plural of threads, each hash table comprising a page count entry corresponding to a table descriptor for each table in the database system, with each hash table being maintained independently by the owning thread. For each thread, when the thread copies a page of a first table in the database system into the cache, the page count value corresponding to the first table's table descriptor is increased in the hash table of the thread. When the thread removes a page of a second table in the database system from the cache, the page count value corresponding to the second table's table descriptor is decreased in the hash table of the thread. For each table descriptor referenced by a query, the corresponding page count values are retrieved from the hash tables of each thread, and a sum of the retrieved page count values for each referenced table descriptor is determined.

In this embodiment, one of the threads may be selected as a master thread. The master thread performs bookkeeping operations, such as initializing new hash tables for new threads, and handling hash table page count entries upon an addition or deletion of a table in the database. Additionally, the master thread may handle the hash table of a deceased thread using a global hash table comprising a global page count entry corresponding to a table descriptor for each table in the database system. For each hash table of the plurality of threads, the master thread: determines if the hash table corresponds to a dead thread; in response to determining that the hash table corresponds to a dead thread, obtains the page count values in the hash table of the dead thread; increases the corresponding global page count values by the obtained page count values; and removes the hash table of the dead thread from memory.

System and computer program products corresponding to the above-summarized methods are also described and claimed herein.

BRIEF DESCRIPTION OF THE SEVERAL VIEWS OF THE DRAWINGS

FIGS. 3a-3b are flowcharts illustrating another embodiment of a method of estimating existing cache content of the present invention.

FIG. 5 illustrates an embodiment of the hash tables.

DETAILED DESCRIPTION

Figure 1:
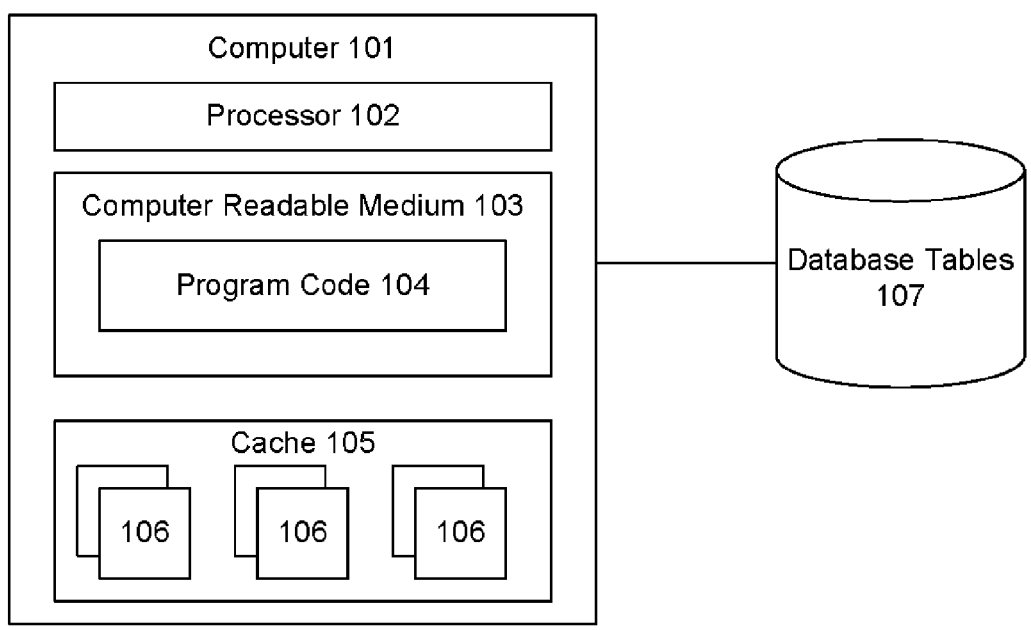
FIG. 1 illustrates an embodiment of a database management system implementing the method of estimating existing cache contents of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a database management system implementing the method of estimating existing cache contents of the present invention. The system comprises a computer 101 operatively coupled to a processor 102 and a computer readable medium 103. The computer readable medium 103 stores computer readable program code 104 for implementing the methods of the present invention. The computer 101 further comprises a cache 105, which stores one or more pages 106 from one or more database tables 107. Each cached page 106 comprises a cache page header (not shown) which maintains a table descriptor identifying the table from to which the page belongs. The processor 102 executes the program code 104 to provide a reasonable count of existing cache contents according to the various embodiments of the present invention.

Figure 2:
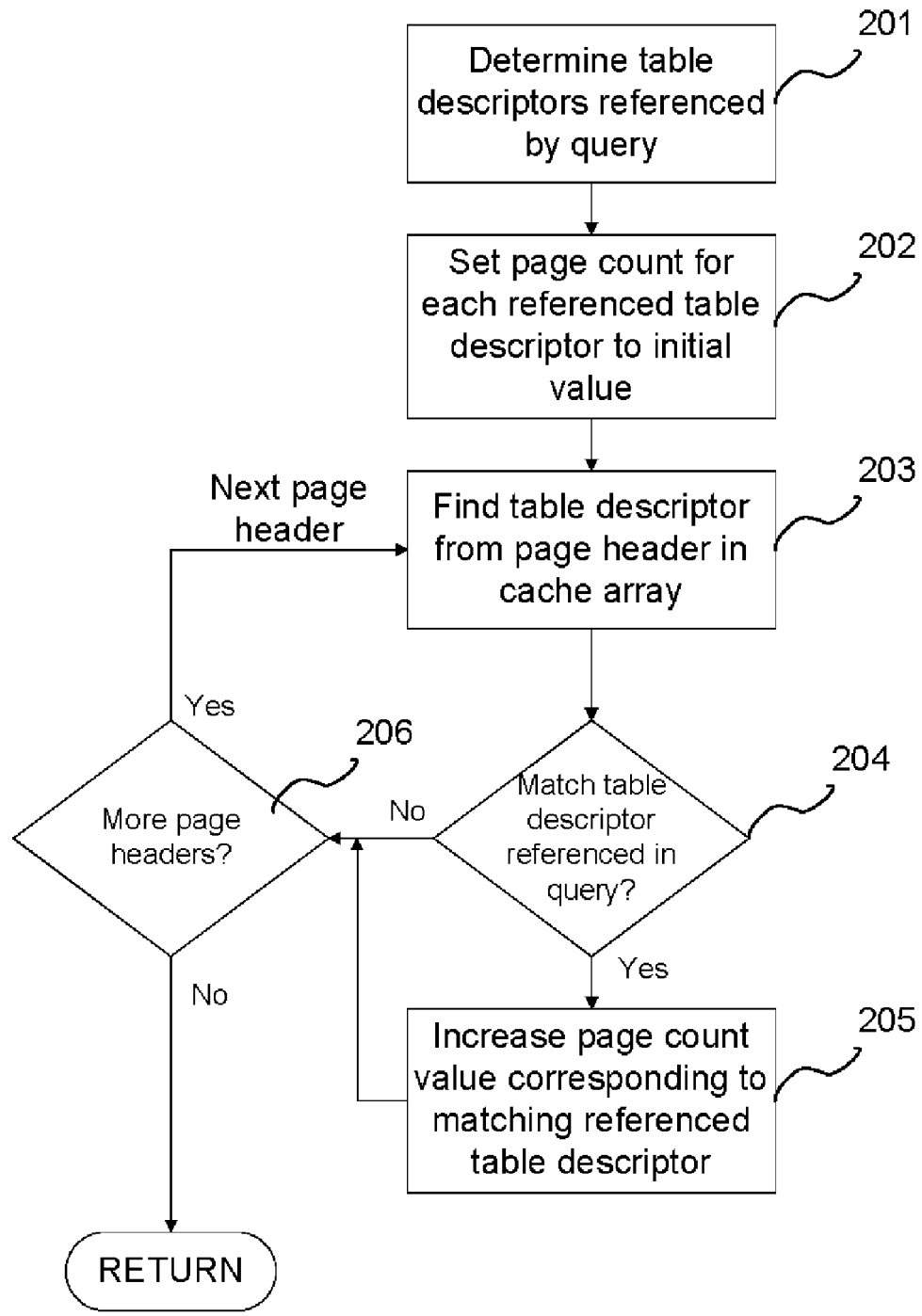
FIG. 2 is a flowchart illustrating an embodiment of a method for estimating existing cache contents of the present invention.

FIG. 2 is a flowchart illustrating an embodiment of a method for estimating existing cache contents of the present invention. In this embodiment, a page count for each database table 107 referenced by a query, in combination with a single scan of the cache page headers, is used to estimate the current contents of the cache 105. First, the table descriptors referenced by the query are determined (201). A page count for each referenced table descriptor is then set to an initial value (202). A single scan of the cache page headers in the cache 105 is then performed. During this scan, the table descriptor from a page header is found (203). It is then determined if the table descriptor from the page header matches a table descriptor referenced in the query (204). In response to a match, the page count value corresponding to the matching referenced table descriptor is increased (205). If there are more page headers in the cache 105 that have not yet been scanned (206), then steps 203-205 are repeated for the next page header. Otherwise, the scan of the page headers is complete, and the final page count values provide the number of pages currently in the cache 105 for each table referenced in the query.

Note that in this embodiment, regardless of the number of tables referenced in the query, only a single scan of the cache page headers is required to obtain the page count values. Further, a scan of the entire cache contents is avoided as only a scan of the page headers is required. These page count values are then outputted and used to determine the costs of query execution plans using methods known in the art. These page count values provide reasonable estimations of the cache contents without incurring significant additional overhead that negatively impacts performance.

In this embodiment a READ lock on the buffer page header(s) (or on the whole cache) need not be taken. The scan is performed independently of other thread's copying of pages into the cache 105 and removal of pages from the cache 105. If there are P threads accessing the cache while the page counts are calculated, then in the worst case, the page counts would be off by P. Since the number of threads accessing the cache is typically not large as compared to the number of pages in the cache 105, the page counts will be reasonably accurate.

FIGS. 3a-3b are flowcharts illustrating another embodiment of a method of estimating existing cache content of the present invention. In this embodiment, a central look-up table of page counts is maintained by a daemon process herein called a "housekeeper" thread. This central look-up table would be stored at a storage location accessible to the threads in the system during a query execution. The central look-up table contains a page count entry corresponding to a table descriptor for each table in the database system (301). The housekeeper thread updates the page count values in the central look-up table when scanning the page headers in the cache 105 periodically. When a predetermined period has elapsed (302), the housekeeper thread sets a page count corresponding to a table descriptor for each table in the database to an initial value, preferable in an intermediate memory (303). The housekeeper thread then scans the page headers in the cache 105. During the scan, the housekeeper thread finds the table descriptor from the page header stored in the cache 105 (304), and the housekeeper thread increases the page count corresponding to this table descriptor (305). If there are more page headers in the cache 105 to be scanned (306), steps 304-306 are repeated for the next page header. Otherwise, the scan of the page headers is complete, and the corresponding page count values in the central look-up table are updated with the page count values determined from the page headers (307). The central look-up table thus holds the number of pages currently in the cache 105 for each table in the database system.

Referring to FIG. 3b, when a query is run by a thread, the thread determines the table descriptors referenced by the query (350). The thread then retrieves the page count values corresponding to the referenced table descriptors from the central look-up table (351). These page count values are then used to determine the cost of query execution plans using methods known in the art. In this embodiment, each time the housekeeper thread performs a scan, only a single scan of the cache page headers is required to update the page count values. In contrast to the embodiment illustrated in FIG. 2, a scan of the page headers in the cache 105 by each thread is not necessary, thus further increasing performance. The retrieval of the page counts from the central look-up table requires less overhead than a scan of the cache 105. The page counts could be estimations because of the time delay in refreshing the central look-up table.

Figure 4A:
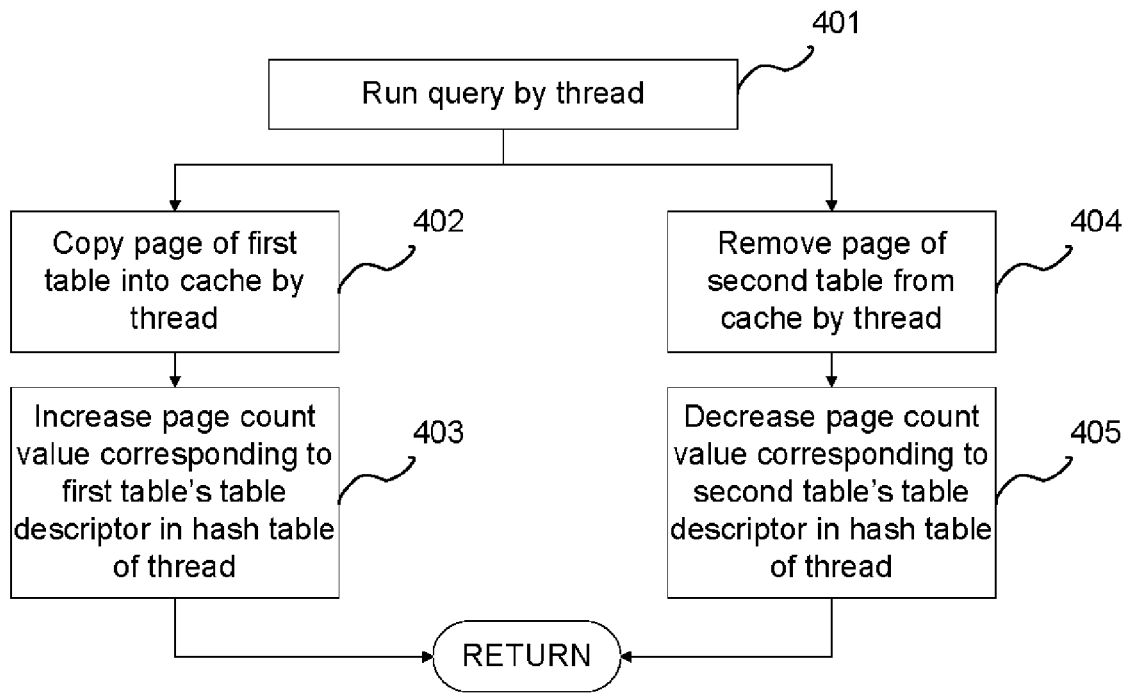
FIGS. 4a and 4b are flowcharts illustrating another embodiment of the method of estimating existing cache contents of the present invention.
Figure 4B:
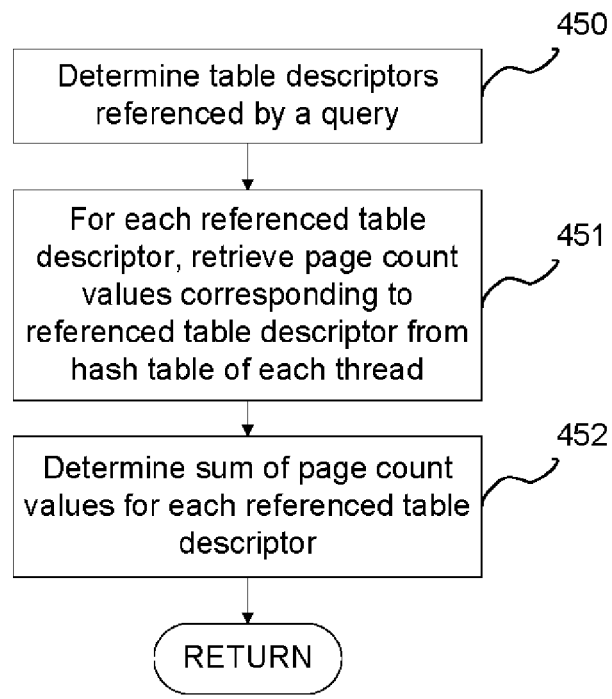

FIGS. 4a and 4b are flowcharts illustrating another embodiment of the method of estimating existing cache contents of the present invention. In this embodiment, each thread in the system maintains a hash table comprising a page count entry corresponding to a table descriptor for each table in the database system. FIG. 5 illustrates an embodiment of the hash tables. Assume that there are 'n' tables and 'm' thread in the database system. Thread $P_1$ maintains Hash Table $H_1$, where $H_1$ contains 'n' number of page count entries, one page count entry corresponding to each table descriptor of each table in the database system. Thread $P_2$ maintains Hash Table $H_2$, where $H_2$ also contains 'n' number of page count entries. Each other thread $P_m$ also maintains a Hash Table $H_m$ containing 'n' number of page count entries. Each hash table is maintained by its owning thread independently of the other threads.

Referring to FIG. 4a, when a given thread $P_m$ runs a query and copies a page of a first table $T_1$ into the cache 105 (402), the thread $P_m$ increases the page count value corresponding to the first table $T_1$'s table descriptor in the hash table $H_m$ of the thread $P_m$ (403). When the thread $P_m$ removes a page of a second table $T_2$ from the cache 105 (404), the thread $P_m$ decreases the page count value corresponding to the second table $T_2$'s table descriptor in the hash table $H_m$ of the thread $P_m$ (405). Each thread in the system maintains its hash table as set forth in steps 401-405 independently of each other. Thus, at any one time, each hash table contains the number of pages of each table in the database system of which the owning thread has stored in the cache 105.

For example, assume that the hash table $H_1$ for thread $P_1$ contains a page count for table $T_1$ with value 'x' and a page count for table $T_2$ with value 'y'. Assume also that $P_1$, in running a query, copies four pages of table $T_1$ from disk to cache 105 (402) and removes three pages belonging to $T_2$ from cache 105 (404). The thread $P_1$ increases the page count value 'x' to 'x+4' (403), and decreases the page count value 'y' to 'y−3' (405).

FIG. 4b illustrates how the page count values in the hash tables $H_1$-$H_m$ are used. When a query is run by any of the threads, the thread determines the table descriptors referenced by the query (450). For each referenced table descriptor, the thread retrieves the page count values corresponding to the referenced table descriptor from the hash table of each thread ($H_1$-$H_m$) (451). The sum of the page count values is then determined to obtain the total number of pages in the cache for each of the referenced table descriptors (452). The sums of the page count values are then used to determine the costs of execution plans using methods known in the art.

Since each hash table ($H_1$-$H_m$) is modified only by its owning thread, no read or write locks are necessary. Although during a read of a page count in a hash table may occur in parallel with a write to the same page count, the resulting error is small. With 'm' number of threads, the maximum error in the resulting sum is 'm−1' (neglecting the thread which is doing the addition operation). Since the number of threads configured in the system is typically small compared to the size of the cache 105, the error will be small as well.

In this embodiment, one of the threads may be selected as a master thread. The master thread performs bookkeeping operations, such as initializing new hash tables for new threads, and handling hash table page count entries upon an addition or deletion of a table in the database. When a new thread joins an existing thread pool, a new hash table is allocated with 'n' number of page counts. The page count values are initialized, and they will be increased or decreased as set forth above. When a new table is created by a thread as part of a 'create table' operation, the master thread inserts a new page count entry corresponding to the new table into each hash table $H_1$-$H_m$ for each thread $P_1$-$P_m$, and sets the new page count entries to an initial value. No locks are required here as the table is new and no operations have yet been performed with this table. When a table is deleted by a thread as part of a 'drop table' operation, the master thread removes from each hash table $H_1$-$H_m$ the page count entry corresponding to the deleted table.

In addition, the master thread may be responsible for handling the hash table of a deceased thread. When a thread dies, the thread removes the data structures it owns, including its hash table. If a thread dies without removing its data structures, the master thread removes them instead. In both situations, the page count values stored in its hash table becomes lost upon the removal of the hash table from memory. However, the pages placed in cache 105 by the dead thread still remain in the cache 105. Without a mechanism to capture these page count values prior to the removal of the hash table from memory, the resulting page count sum per step 452 (FIG. 4b) may contain an undesirably large error.

Figure 6A:
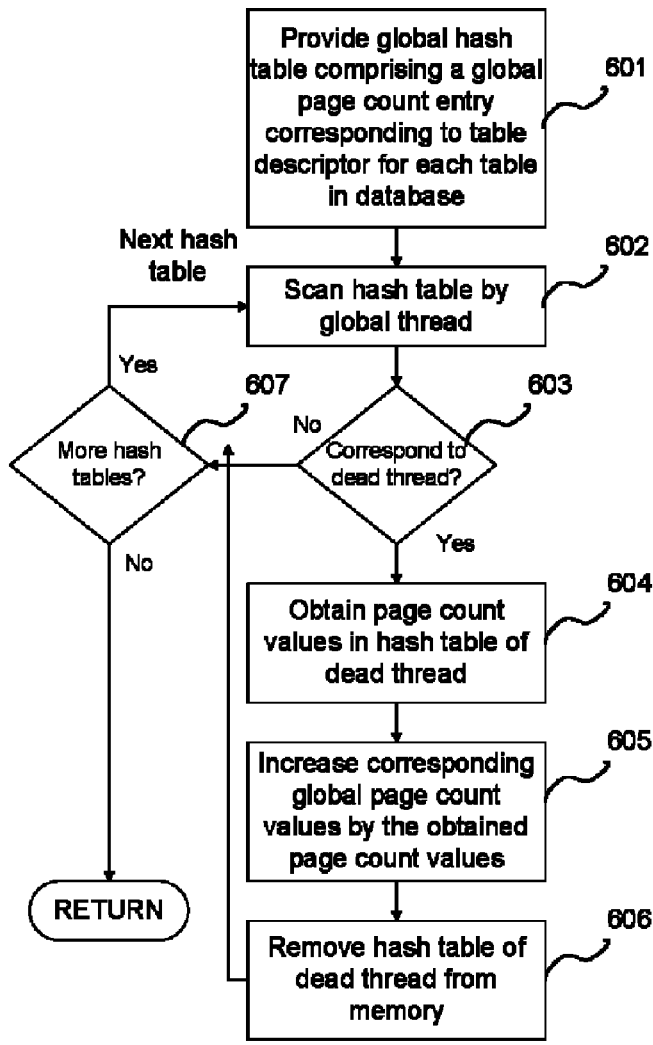
FIGS. 6a-6b are flowcharts illustrating the maintenance of the global hash table by the master thread according to an embodiment of the present invention.

In this embodiment, this problem is addressed by the master thread through the use of a global hash table in addition to the hash tables $H_1$-$H_m$. When a thread dies, the master thread performs the function of removing its hash table. FIG. 6a is a flowchart illustrating the maintenance of the global hash table by the master thread according to an embodiment of the present invention. As with the hash tables $H_1$-$H_m$ owned by each thread, the global hash table has a global page count entry corresponding to a table descriptor for each table in the database system (601). On a periodic basis, the master thread scans the hash tables $H_1$-$H_m$ (602). For a given hash table, the master thread determines if the hash table corresponds to a dead thread (603). If so, then the master thread obtains the page count values in the hash table of the dead thread (604) and increases the corresponding global page count values by the obtained page count values (605). For example, assume that hash table $H_1$ corresponds to dead thread $P_1$, and there are 'x' number of tables. The master thread obtains page count values for table descriptors $T_1$-$T_x$ from hash table $H_1$ (604) and increases the corresponding global page count values for $T_1$-$T_x$ in the global hash table by the page count values from hash table $H_1$ (605). Then the hash table of the dead thread is removed from memory (606). If there are more hash tables to scan (607), the master thread repeats steps 602-606 with the next hash table. Otherwise, the update of the global hash table completes. When a query is run per FIG. 4b, the page count values corresponding to the table descriptors referenced by the query would include the page count values from the hash table of each thread ($H_1$-$H_m$) as well as the page count value in the global hash table (451). The determined sum of the page count values (452) would then include the page count value for any dead threads.

In addition to being used to address the hash tables of dead threads, the global hash table may also be used to handle potential overflow of the page count values in the hash tables $H_1$-$H_m$. Consider the situation with two threads, $P_1$ and $P_2$. Assume that $P_1$ stores a page of table $T_1$ from disk into cache and increases the corresponding page count value in its hash table $H_1$ for $T_1$ to '1'. $P_2$ removes the page of $T_1$ following an existing page replacement strategy and decreases its corresponding page count value in its hash table $H_2$ for $T_1$ to '−1'. Then assume that $P_1$ requires the page of $T_1$, cannot find the page in the cache, and stores the page from disk into cache again and increase the corresponding page count value for $T_1$ to '2'. $P_2$ again deletes the page due to some other purpose and decreases its page count to '−2'. If this continues, the page count values for $T_1$ in hash table $H_1$ and $H_2$ could become large enough to result in an overflow.

Figure 6B:
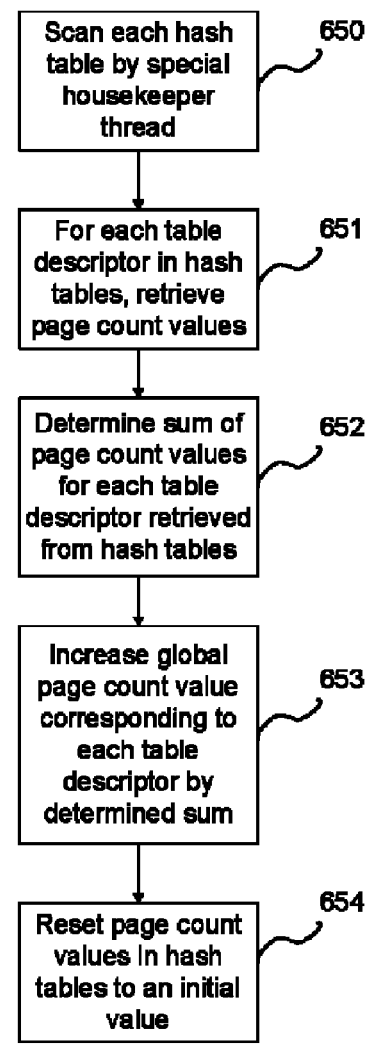

To address this potential problem, a special housekeeper thread can be designated to run periodically. FIG. 6b is a flowchart illustrating the prevention of overflow by the special housekeeper thread according to an embodiment of the present invention. The special housekeeper thread scans each hash table $H_1$-$H_m$ (650). For each table descriptor in the hash tables $H_1$-$H_m$, the special housekeeper thread retrieves the page count values (651), and determines the sum of the page count values for each table descriptor retrieved from the hash tables $H_1$-$H_m$, (652). The special housekeeper thread increase the global page count values corresponding to each table descriptor by the determined sum (653), and resets the page count values in the hash tables $H_1$-$H_m$ to an initial value (654).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for estimating contents of a cache by a computer comprising a processor, comprising:
   determining, by the processor, table descriptors referenced by a query, wherein each table descriptor identifies one or more tables in a database system, wherein the determining table descriptors referenced by the query comprises:
   providing a central lookup table comprising a page count entry corresponding to a table descriptor for each table in the database system;
   using a single scan of each page header stored in the cache, determining, by the processor, if a table descriptor from each page header matches any of the table descriptors referenced by the query;
   for each table descriptor from the page headers stored in the cache determined to match any of the table descriptors referenced by the query, increasing, by the processor, a page count value corresponding to the matching table descriptor referenced by the querying, wherein the page count value corresponding to the table descriptor for each table in the database is set to an initial value in an intermediate memory, wherein the increasing the page count value corresponding to the matching table descriptor referenced by the query further comprises:
   updating the corresponding page count value in the central look-up table with the page count values corresponding to the matching table descriptor referenced by the query;
   estimating, by the processor, the contents of the cache using the page count values for each table descriptor referenced by the query; and
   calculating, by the processor, a cost of a query execution plan for the query using the estimated contents of the cache.

2. The method of claim 1, wherein the determining the table descriptor referenced by the query comprises:
   setting a page count for each referenced table descriptor to an initial value.

3. The method of claim 1, wherein the estimating the contents of the cache using the page count values for each table descriptor referenced by the query comprises: retrieving the page count values corresponding to the table descriptors referenced by the query from the central lookup table.

4. The method of claim 1, wherein the database system comprises a plurality of threads, wherein the increasing the page count value corresponding to the matching table descriptor referenced by the query comprises:
   providing a hash table for each of the plurality of threads, each hash table comprising a page count entry corresponding to a table descriptor for each table in the database system, each hash table maintained independently by the owning thread;
   for each thread of the plurality of threads:
   when the thread copies a page of a first table in the database system into the cache, increasing the page count value corresponding to the first table's table descriptor in the hash table of the thread; and
   when the thread removes a page of a second table in the database system from the cache, decreasing the page count value corresponding to the second table's table descriptor in the hash table of the thread.

5. The method of claim 4,
   wherein the estimating the contents of the cache using the page count value for each table descriptor referenced by the query comprises:
   retrieving the page count values corresponding to each table descriptor referenced by the query from the hash tables of each thread; and
   determining a sum of the retrieved page count values for each table descriptor referenced by the query.

6. A method for estimating contents of a cache by a computer comprising a processor, comprising:
   determining table descriptors referenced by a query for one or more tables in a database system, wherein the database system comprises a plurality of threads;
   determining a page count value for each referenced table descriptor using a single scan of table descriptors in page headers stored in a cache, comprising:
   providing a hash table for each of the plurality of threads, each hash table comprising a page count entry corresponding to a table descriptor for each table in the database system, each hash table maintained independently by the owning thread;
   for each thread of the plurality of threads:
   when the thread copies a page of a first table in the database system into the cache, increasing the page count value corresponding to the first table's table descriptor in the hash table of the thread;
   when the thread removes a page of a second table in the database system from the cache, decreasing the page count value corresponding to the second table's table descriptor in the hash table of the thread;
   providing a global hash table comprising a global page count entry corresponding to a table descriptor for each table in the database system, wherein for each hash table of the plurality of threads:
   determining if the hash table corresponds to a dead thread;
   in response to determining that the hash table corresponds to a dead thread, obtaining the page count values in the hash table of the dead thread;
   increasing the corresponding global page count values by the obtained page count values; and
   removing the hash table of the dead thread from memory; and
   estimating the contents of the cache using the determined page count values, comprising:
   retrieving the page count values corresponding to each referenced table descriptor from the hash tables of each thread; and
   determining a sum of the retrieved page count values for each referenced table descriptor.

7. The method of claim 6, wherein for each referenced table descriptor in the query, the estimating of the contents of the cache using the determine page count values comprises:

retrieving the page count values corresponding to the referenced table descriptor from the hash table of each thread and from the global hash table; and determining the sum of the retrieved page count values.

8. The method of claim 4, further comprising:

providing a global hash table comprising a global page count entry corresponding to the table descriptor for each table in the database system;

retrieving the page count values corresponding to each table descriptor from the hash tables of each thread;

determining a sum of the retrieved page count values for each table descriptor;

increasing the corresponding global page count value by the determined sum of each table descriptor; and setting the page count values in the hash tables of each thread to an initial value.

9. A computer readable memory device comprising a computer program product for estimating contents of a cache, the computer program product executed by a processor comprising:

a computer readable memory having computer readable program code embodied therewith, the computer readable program code configured to:

determine table descriptors referenced by a query, wherein each table descriptor identifies one or more tables in a database system;

set a page count value for each referenced table descriptor to an initial value;

provide a central lookup table comprising a page count entry corresponding to a table descriptor for each table in the database system, wherein the page count value corresponding to the table descriptor for each table in the database system is set to the initial value in an intermediate memory, wherein the computer readable program code configured to increase the page count value corresponding to the matching table descriptor referenced by the query is further configured to:

update the corresponding page count value in the central look-up table with the page count values corresponding to the matching table descriptor referenced by the query;

using a single scan of each page header stored in the cache, determine if a table descriptor from each page header matches any of the table descriptors referenced by the query;

for each table descriptor from the page headers stored in the cache determined to match any of the table descriptors referenced by the query, increase a page count value corresponding to the matching table descriptor referenced by the query estimate the contents of the cache using the page count value for each table descriptor referenced by the query; and calculate a cost of a query execution plan for the query using the estimated contents of the cache.

10. The computer readable program product of claim 9, wherein the database system comprises a plurality of threads, wherein the computer readable program code configured to increase the page count value corresponding to the matching table descriptor referenced by the query is further configured to:

provide a hash table for each of the plurality of threads, each hash table comprising a page count entry corresponding to a table descriptor for each table in the database system, each hash table maintained independently by the owning thread;

for each thread of the plurality of threads:

when the thread copies a page of a first table in the database system into the cache, increase the page count value corresponding to the first table's table descriptor in the hash table of the thread; and when the thread removes a page of a second table in the database system from the cache, decrease the page count value corresponding to the second table's table descriptor in the hash table of the thread.

11. The computer program product of claim 10, wherein the computer readable program code configured to estimate the contents of the cache using the page count value for each table descriptor referenced by the query is further configured to:

retrieve the page count values corresponding to each table descriptor referenced by the query from the hash tables of each thread; and determine a sum of the retrieved page count values for each table descriptor referenced by the query.

12. A system, comprising:

database tables, each database table comprising a plurality of pages; and a computer operatively coupled to the database tables, the computer comprising;

a processor;

a cache comprising copies of one or more of the plurality of pages; and a computer readable memory operatively coupled to the processor and the cache, the computer readable memory having computer readable program code embodied therewith, the computer readable program code configured to:

determine table descriptors referenced by a query, wherein each table descriptor identifies one or more tables of the database tables;

set a page count value for each referenced table descriptor to an initial value:

provide a central lookup table comprising a page count entry corresponding to a table descriptor for each table in the database system, wherein the page count value corresponding to the table descriptor for each table in the database system is set to the initial value in an intermediate memory, wherein the computer readable program code configured to increase the page count value corresponding to the matching table descriptor referenced by the query is further configured to:

update the corresponding page count value in the central look-up table with the page count value corresponding to the matching table descriptor referenced by the query;

using a single scan of each page header stored in the cache, determine if a table descriptor from each page header matches any of the table descriptors referenced by the query;

for each table descriptor from the page headers stored in the cache determined to match any of the table descriptors referenced by the query, increase a page count value corresponding to the matching table descriptor referenced by the query;

estimate contents of the cache using the page count value for each table descriptor referenced by the query; and calculate a cost of a query execution plan for the query using the estimated contents of the cache.

13. The system of claim 12, further comprising a plurality of threads, wherein the computer readable program code configured to increase the page count value corresponding to the matching table descriptor referenced by the query is further configured to:

provide a hash table for each of the plurality of threads, each hash table comprising a page count entry corresponding to a table descriptor for each table in the database system, each hash table maintained independently by the owning thread;

for each thread of the plurality of threads:
when the thread copies a page of a first table in the database system into the cache, increase the page count value corresponding to the first table's table descriptor in the hash table of the thread; and
when the thread removes a page of a second table in the database system from the cache, decrease the page count value corresponding to the second table's table descriptor in the hash table of the thread, wherein the computer readable program code configured to determine the referenced table descriptors for the one or more tables in the database system is further configured to: determine table descriptors referenced by a query;

wherein for each referenced table descriptor, the computer readable program code configured to estimate the contents of the cache using the determined page count values is further configured to:
retrieve the page count values corresponding to each referenced table descriptor from the hash tables of each thread; and
determine a sum of the retrieved page count values for each referenced table descriptor.

14. A computer readable memory device comprising a computer program product for estimating contents of a cache, the computer program product executed by a processor comprising:

a computer readable memory having computer readable program code embodied therewith, the computer readable program code configured to:
determine table descriptors referenced by a query for one or more tables in a database system, wherein the database system comprises a plurality of threads;
determine a page count value for each referenced table descriptor using a single scan of table descriptors in page headers stored in a cache, configured to:
provide a hash table for each of the plurality of threads, each hash table comprising a page count entry corresponding to a table descriptor for each table in the database system, each hash table maintained independently by the owning thread;
for each thread of the plurality of threads:
when the thread copies a page of a first table in the database system into the cache, increase the page count value corresponding to the first table's table descriptor in the hash table of the thread;
when the thread removes a page of a second table in the database system from the cache, decrease the page count value corresponding to the second table's table descriptor in the hash table of the thread;
provide a global hash table comprising a global page count entry corresponding to a table descriptor for each table in the database system, wherein for each hash table of the plurality of threads:
determine if the hash table corresponds to a dead thread;
in response to determining that the hash table corresponds to a dead thread, obtain the page count values in the hash table of the dead thread;
increase the corresponding global page count values by the obtained page count values; and
remove the hash table of the dead thread from memory; and
estimate the contents of the cache using the determined page count values, comprising:
retrieve the page count values corresponding to each referenced table descriptor from the hash tables of each thread; and
determine a sum of the retrieved page count values for each referenced table descriptor.

15. A system, comprising:
database tables, each database table comprising a plurality of pages; and
a computer operatively coupled to the database tables, the computer comprising:
a processor;
a cache comprising copies of one or more of the plurality of pages; and
a computer readable memory operatively coupled to the processor and the cache, the computer readable memory having computer readable program code embodied therewith, the computer readable program code configured to:
determine table descriptors referenced by a query for one or more tables in a database system, wherein the database system comprises a plurality of threads;
determine a page count value for each referenced table descriptor using a single scan of table descriptors in page headers stored in a cache, configured to:
provide a hash table for each of the plurality of threads, each hash table comprising a page count entry corresponding to a table descriptor for each table in the database system, each hash table maintained independently by the owning thread;
for each thread of the plurality of threads:
when the thread copies a page of a first table in the database system into the cache, increase the page count value corresponding to the first table's table descriptor in the hash table of the thread;
when the thread removes a page of a second table in the database system from the cache, decrease the page count value corresponding to the second table's table descriptor in the hash table of the thread;
provide a global hash table comprising a global page count entry corresponding to a table descriptor for each table in the database system, wherein for each hash table of the plurality of threads:
determine if the hash table corresponds to a dead thread;
in response to determining that the hash table corresponds to a dead thread, obtain the page count values in the hash table of the dead thread;
increase the corresponding global page count values by the obtained page count values; and
remove the hash table of the dead thread from memory; and
estimate the contents of the cache using the determined page count values, comprising:
retrieve the page count values corresponding to each referenced table descriptor from the hash tables of each thread; and
determine a sum of the retrieved page count values for each referenced table descriptor.

* * * * *